(12) United States Patent
Liu et al.

(10) Patent No.: US 11,975,619 B2
(45) Date of Patent: *May 7, 2024

(54) CONTROLLERS, DEVICES, AND METHODS FOR PERFORMING POWER QUALITY CONTROL USING DIRECT CURRENT FAST CHARGING DEVICES

(71) Applicant: Rivian IP Holdings, LLC, Plymouth, MI (US)

(72) Inventors: Yang Liu, Irvine, CA (US); Steven Schulz, Torrance, CA (US); Ming Li, Torrance, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/120,462

(22) Filed: Mar. 13, 2023

(65) Prior Publication Data

US 2023/0219431 A1    Jul. 13, 2023

Related U.S. Application Data

(63) Continuation of application No. 17/388,089, filed on Jul. 29, 2021, now Pat. No. 11,628,732.

(51) Int. Cl.
*B60L 53/10* (2019.01)
*H02J 7/00* (2006.01)

(52) U.S. Cl.
CPC .......... *B60L 53/11* (2019.02); *H02J 7/00034* (2020.01); *B60L 2210/30* (2013.01); *H02J 2310/48* (2020.01)

(58) Field of Classification Search
CPC ...... B60L 53/11; B60L 2210/30; B60L 53/63; H02J 7/00034; H02J 2310/48; H02J 3/01; H02J 2207/20; H02J 7/007182; H02J 7/00714; Y02T 10/70; Y02T 10/7072; Y02T 90/12; Y02T 90/14
USPC .......................................................... 320/109
See application file for complete search history.

(56) References Cited

U.S. PATENT DOCUMENTS

| | | | |
|---|---|---|---|
| 2015/0137751 A1* | 5/2015 | King | B60L 53/11 320/109 |
| 2015/0375627 A1* | 12/2015 | Weber | B60L 53/63 320/109 |
| 2021/0261009 A1* | 8/2021 | Eull | H02M 1/44 |
| 2022/0393486 A1* | 12/2022 | Mousavi | H02J 7/005 |

OTHER PUBLICATIONS

List of References in corresponding U.S. Appl. No. 17/388,089.

* cited by examiner

*Primary Examiner* — Paul Dinh
(74) *Attorney, Agent, or Firm* — Foley & Lardner LLP

(57) ABSTRACT

Various disclosed embodiments include illustrative controller units, direct current fast charging (DCFC) units, and methods. In an illustrative embodiment, a controller unit includes a controller and a memory configured to store computer-executable instructions. The computer-executable instructions are configured to cause the controller to determine status of a power electronics module (PEM) of a direct current fast charging (DCFC) unit, and instruct the PEM to control power quality of a three-phase alternating current (AC) grid power signal in response to the determined status being available.

20 Claims, 6 Drawing Sheets

CONTROLLERS, DEVICES, AND METHODS FOR PERFORMING POWER QUALITY CONTROL USING DIRECT CURRENT FAST CHARGING DEVICES

CROSS-REFERENCE TO RELATED APPLICATION

The present disclosure is a continuation (CON) of co-pending U.S. patent application Ser. No. 17/388,089, filed on Jul. 29, 2021, and entitled "CONTROLLERS, DEVICES, AND METHODS FOR PERFORMING POWER QUALITY CONTROL USING DIRECT CURRENT FAST CHARGING DEVICES," the contents of which are incorporated in full by reference herein.

INTRODUCTION

The present disclosure relates to electric vehicle charging systems. The statements in this section merely provide background information related to the present disclosure and may not constitute prior art.

Electric vehicle fast charging systems are known to provide battery charging solution with higher power thus reduce charging time. Some plans for charging networks include modular power electronics module (PEM) which provide scalable very high charging capability located in rural or microgrid, where the grid is not stiff. Further, when large penetration of renewable energy is installed or large charging depots (pumps, fans, large transformers) are present, system power factor reduction may occur or unwanted harmonics may be introduced. These can lead to energy losses, shortened equipment lifespans, and reduced efficiency of devices connected to the grid.

BRIEF SUMMARY

Various disclosed embodiments include illustrative controller units, direct current fast charging (DCFC) units, and methods.

In an illustrative embodiment, a controller unit includes a controller and a memory configured to store computer-executable instructions. The computer-executable instructions are configured to cause the controller to determine status of a power electronics module (PEM) of a direct current fast charging (DCFC) unit, and instruct the PEM to control power flow or power quality of a three-phase alternating current (AC) grid power signal in response to the determined status being available.

In another illustrative embodiment, a DCFC unit includes a power electronics module (PEM), a first controller, and a memory configured to store computer-executable instructions. The computer-executable instructions are configured to cause the first controller to determine status of the PEM and instruct the PEM to control power quality of a three-phase alternating current (AC) grid power signal in response to the determined status being available.

In another illustrative embodiment, a method includes determining status of a power electronics module (PEM) of a direct current fast charging (DCFC) unit, and instructing the PEM to control power quality of a three-phase alternating current (AC) signal in response to the determined status being available.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
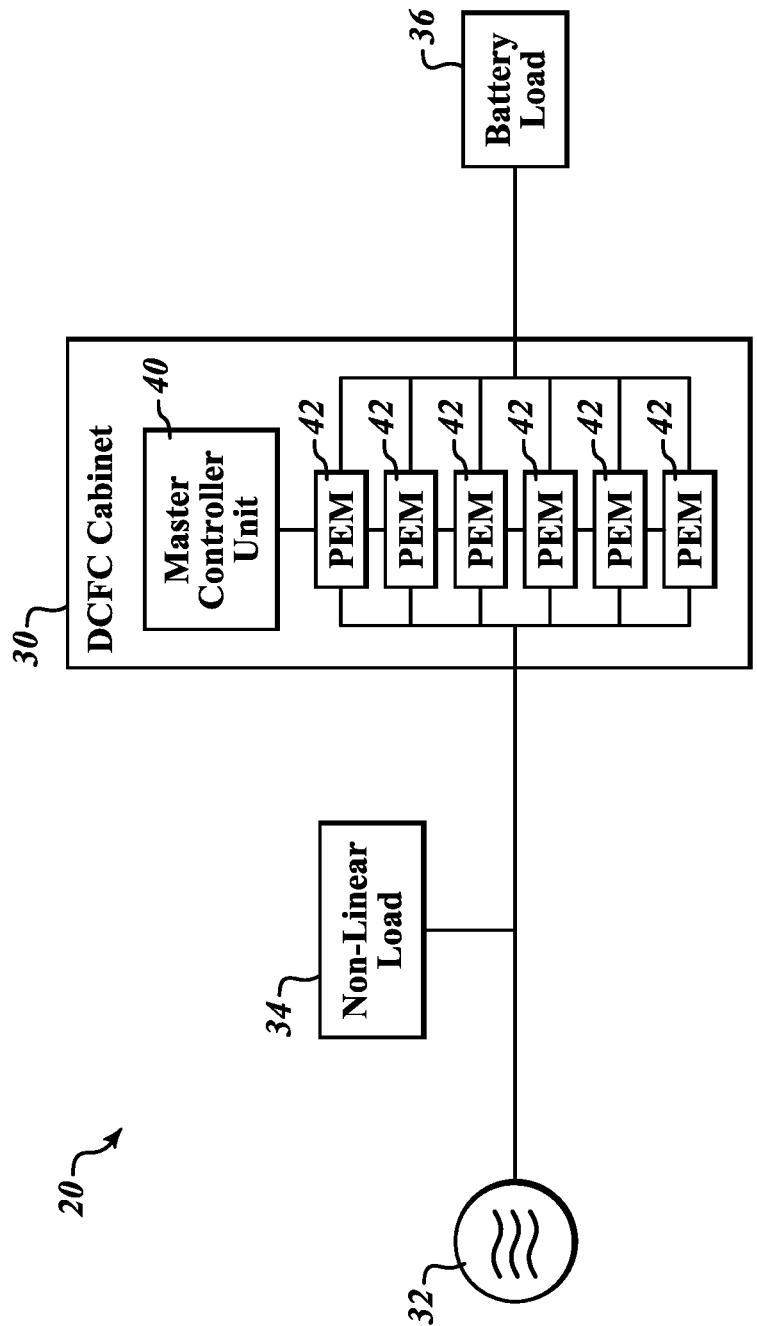
FIG. 1 is a block diagram in partial schematic form of an illustrative direct current (DC) charging unit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative controller units, direct current fast charging (DCFC) units, and methods.

Referring to FIG. 1, in various embodiments an illustrative power distribution network 20 may include a direct current fast charging (DCFC) unit 30 and a non-linear load 34 connected to an alternating current (AC) grid energy source 32. In various embodiments the DCFC unit 30 provides DC power to a rechargable battery load 36, such as, without limitation, a bank of rechargeable batteries. The bank of rechargeable batteries may be disposed in a motor vehicle.

Those skilled in the art will appreciate that the AC grid energy source 32 may provide electrical power from a variety of different devices, such as wind turbine, solar cell, geothermal, nuclear power plants, hydro-electric power plants, coal-run power plants, or any mechanism that can produce three-phase electrical power.

In various embodiments the non-linear load 34 is a device that produces impedance changes with applied voltage. The changing impedance means that the current drawn by the non-linear load 34 will not be sinusoidal even when it is connected to a sinusoidal voltage. These non-sinusoidal currents contain harmonic currents that interact with the impedance of the power distribution system (the AC grid energy source 32) to create voltage and current distortion that can affect both the power distribution system and other loads (the DCFC unit 30) connected to power distribution system. The non-linear load 34 may include a heavy industrial application, such as an arc furnace, a large variable frequency drive (VFD), a heavy rectifier for electrolytic refining, power conversion technologies, such as electronic devices (computers, servers, monitors, printers, photocopiers, telecom systems, broadcasting equipment, banking machines, and the like) or other inductive load devices. The non-linear load 34 will be further described below with reference to FIG. 2.

In various embodiments the DCFC unit 30 includes multiple power electronics modules (PEMs) 42 and a master controller unit 40. In various embodiments the master controller unit 40 controls the PEMs 42 for converting AC from the AC grid energy source 32 for output as DC power to an EV via a connector. The PEMs 42 and the master controller unit 40 will be described below with reference to FIG. 2.

Figure 2:
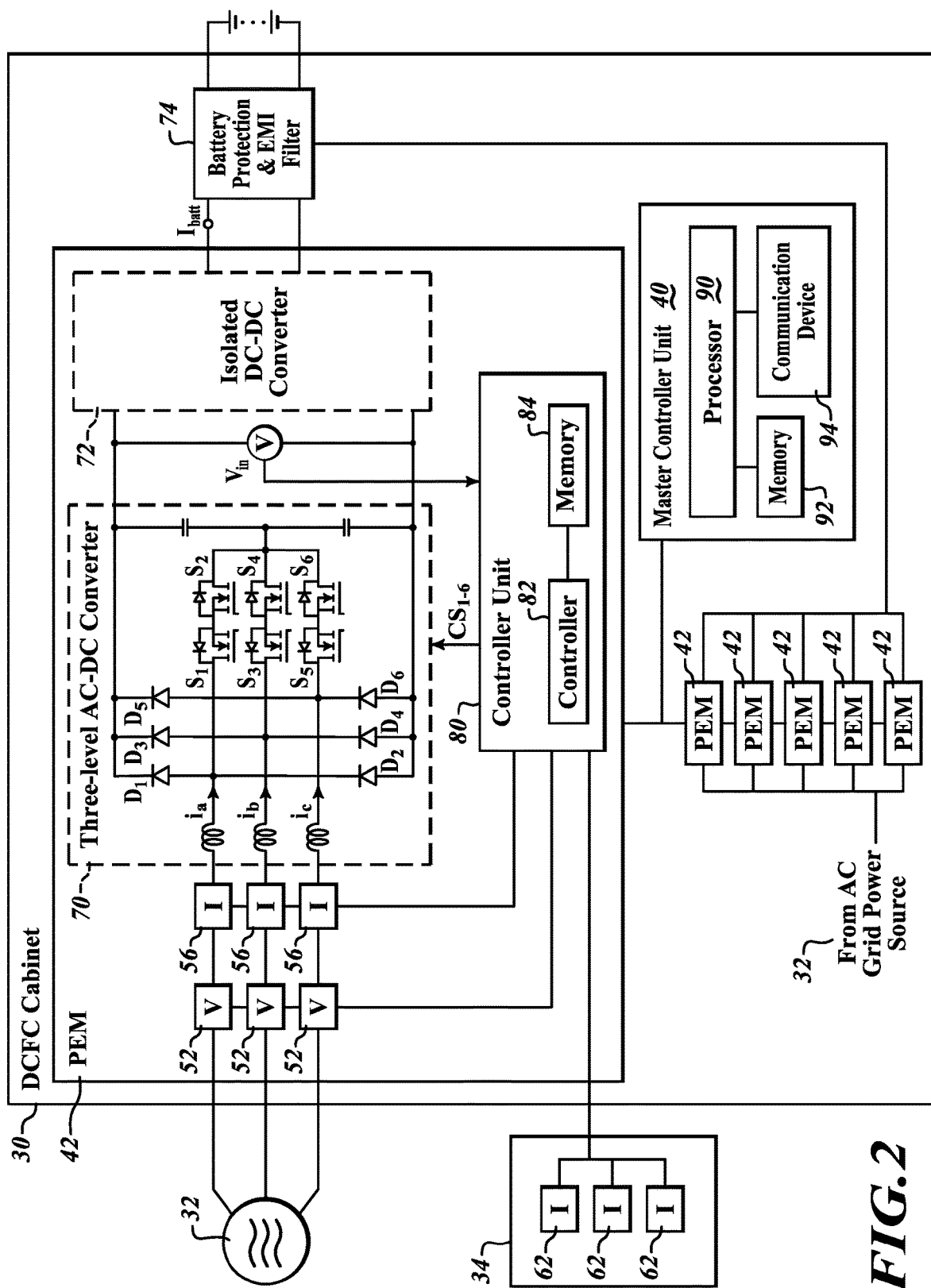
FIG. 2 is a block diagram of components of the DC charging unit of FIG. 1.

Referring additionally to FIG. 2, in various embodiments each PEM 42 may includes three-phase grid voltage sensors 52 and three-phase grid current sensors 56. In various embodiments the three-phase grid current sensors 56 may include current transformer, Rogowski coils, Hall effect sensors, fluxgate sensors, magneto-resistive current sensors, or the like. In various embodiments the three-phase grid voltage sensors 52 may include capacitive-type voltage sensors, resistive-type voltage sensors, or the like. Current and voltage sensors are well known in the art and, accordingly, their construction and operation need not be explained for a person of skill in the art to understand disclosed subject matter.

In various embodiments the master controller unit 40 includes a controller 90, a communication device 94, and a memory 92 configured to store computer-executable instructions.

In various embodiments the non-linear load 34 may include three-phase current sensors 62. The non-linear load 34 may be an inductive load device. In such embodiments the three-phase current sensors 62 provide a current value for each phase of three-phase power received at the non-linear load 34. Types of current sensors are described above with regard to the current sensors 56. Current sensors are well known in the art and, accordingly, their construction and operation need not be explained for a person of skill in the art to understand disclosed subject matter.

In various embodiments the PEM 42 includes a controller unit 80 having a controller 82 and a memory 84 configured to store computer-executable instructions. The PEM 42 also includes an AC-DC converter 70, a DC-DC converter 72, and a battery protection & electromagnetic interference (EMI) filter 74. The three-phase current sensors 56 and the three-phase voltage sensors 52 are disposed between the AC grid energy source 32 and the AC-DC converter 70.

In various embodiments the AC-DC converter 70 is a Vienna rectifier, but other high-power, three-phase rectifiers may be used as desired. AC-DC converters are well known in the art and operation will be described in more detail below.

In various embodiments the DC-DC converter 72 uses high-efficiency semiconductors to adjust the DC voltage efficiently to the optimum value(s) for the battery load 36. DC-DC converters are well known in the art and, accordingly, their construction and operation need not be explained for a person of skill in the art to understand disclosed subject matter.

In various embodiments the battery protection & electromagnetic interference (EMI) filter 74 may include devices for protecting the battery load 36 and circuitry of the DCFC unit 30. The devices within the battery protection & EMI filter 74 may include surge protectors, transient voltage suppressors, or the like. Battery protection & EMI filters are well known in the art and, accordingly, their construction and operation need not be explained for a person of skill in the art to understand disclosed subject matter.

It will be appreciated that the PEM controller 82 and the controller 90 of the master controller unit 40 may be any type of controller as desired for a particular application, such as without limitation, a microcontroller or the like. In various embodiments, the controller 82 and the controller 90 may include one or more generic or specialized processors such as: microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. In some embodiments, some or all functions may be implemented by a state machine that has no stored program instructions, or in one or more application-specific integrated circuits (ASICs), in which each function or some combinations of certain of the functions are implemented as custom logic or circuitry. It will be appreciated that a combination of the aforementioned approaches may be used. For some of the embodiments described herein, a corresponding device in hardware and optionally with software, firmware, and a combination thereof can be referred to as a "controller configured to" perform a set of operations, steps, methods, processes, algorithms, functions, techniques, etc. on digital and/or analog signals as described herein for the various embodiments.

As discussed above, various embodiments include the memory 84 and the memory 92 (non-transitory computer-readable storage medium) having computer-readable code (instructions) stored thereon for causing the controller 82 and the controller 90 to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include the instructions executable by the controller 82 and the controller 90 that, in response to such execution, causes performance of a set of operations, steps, methods, processes, algorithms, functions, techniques, etc. as described herein for the various embodiments.

In various embodiments the instructions within the memory 92 cause the controller 90 to determine status of the PEMs 42 and instruct one or more of the PEMs 42 to control power quality of a three-phase alternating current (AC) grid power signal in response to the determined status of the one PEM 42 being available. Typically, the PEMs 42 operate in a charging mode, whereby the PEMs 42 receive three-phase AC grid power and convert the three-phase AC grid power to DC power. The DC power outputted by each of the PEMs 42 are combined and delivered to an EV via a connector.

In some charging situations, the EV does not require the full amount of power from all the PEMs 42. In this situation, the PEMs 42 that are not being used are placed in an available or a sleep mode status. Thus, the PEMs 42 that are not being used are repurposed for performing power quality control, as will be described below.

In various embodiments the instructions are further configured to cause the controller 90 to terminate instructing the PEM 42 to control power quality in response to the determined status being unavailable. The PEM 42 is unavailable in response to being requested to perform charging operations.

In various embodiments the instructions are further configured to cause the controller 90 to determine that a power quality control condition does not exist and terminate instructing the PEM 42 to control power quality in response to the determination that the power quality control condition does not exist. It can be appreciated that a number of factors may be responsible for a power quality control condition to not exist. In various embodiments, the non-linear load 34 or the DCFC unit 30 may be placed in an off state, a current value of the AC grid poser signal is below a threshold value, or some other factor limiting a desire for performing power quality control.

In various embodiments and given by way of example only and not of limitation, the current sensors 56 sense current values for the three-phase signals received at the DCFC unit 30. The voltage sensors 52 sense voltage values for the three-phase signals received at the DCFC unit 30. The current sensors 56 and the voltage sensors 52 may include current and voltage transducers, respectively. Current and voltage transducers are well known in the art and no further explanation is necessary for a person of skill in the art to understand disclosed subject matter. The current sensors 56 and the voltage sensors 52 may communicate with numerous other components of the DCFC unit 30 via a peer-to-peer network bus, such as a controller area network (CAN) bus. Other peer-to-peer network buses, such as a local area network (LAN), a wide area network (WAN), or a value-added network (VAN), may also be used for enabling communication between the components connected to the peer-to-peer network.

In various embodiments the communication device 94 is configured to receive three-phase current values from current sensors 62 disposed at the non-linear load 34 sharing a three-phase grid power signal with the DCFC unit 30. Communication between the DCFC unit 30 and the non-linear load 34 may be performed over a public or a private data network or directly via a wired or a wireless connection. In various embodiments the communication device 94 may include circuitry, a processor, a memory configured to stored computer-executable instructions configured to cause the processor to be able to receive and send instructions between the battery load 36 in accordance with a communication protocol, such as, without limitation, a Combined Charging System (CCS) protocol, a CHAdeMO protocol, or other charger protocols that allow for the transmission and reception of instructions to and from the battery load 36. Communication devices for communicating with the protocols described above are well known in the art and no further explanation is necessary for a person of skill in the art to understand disclosed subject matter.

In various embodiments the instructions in the memory 84 are configured to cause the PEM controller 82 to generate control signals in response to the received three-phase current values and the received three-phase grid current values and send the generated control signals to the AC-DC converter 70.

Figure 3:
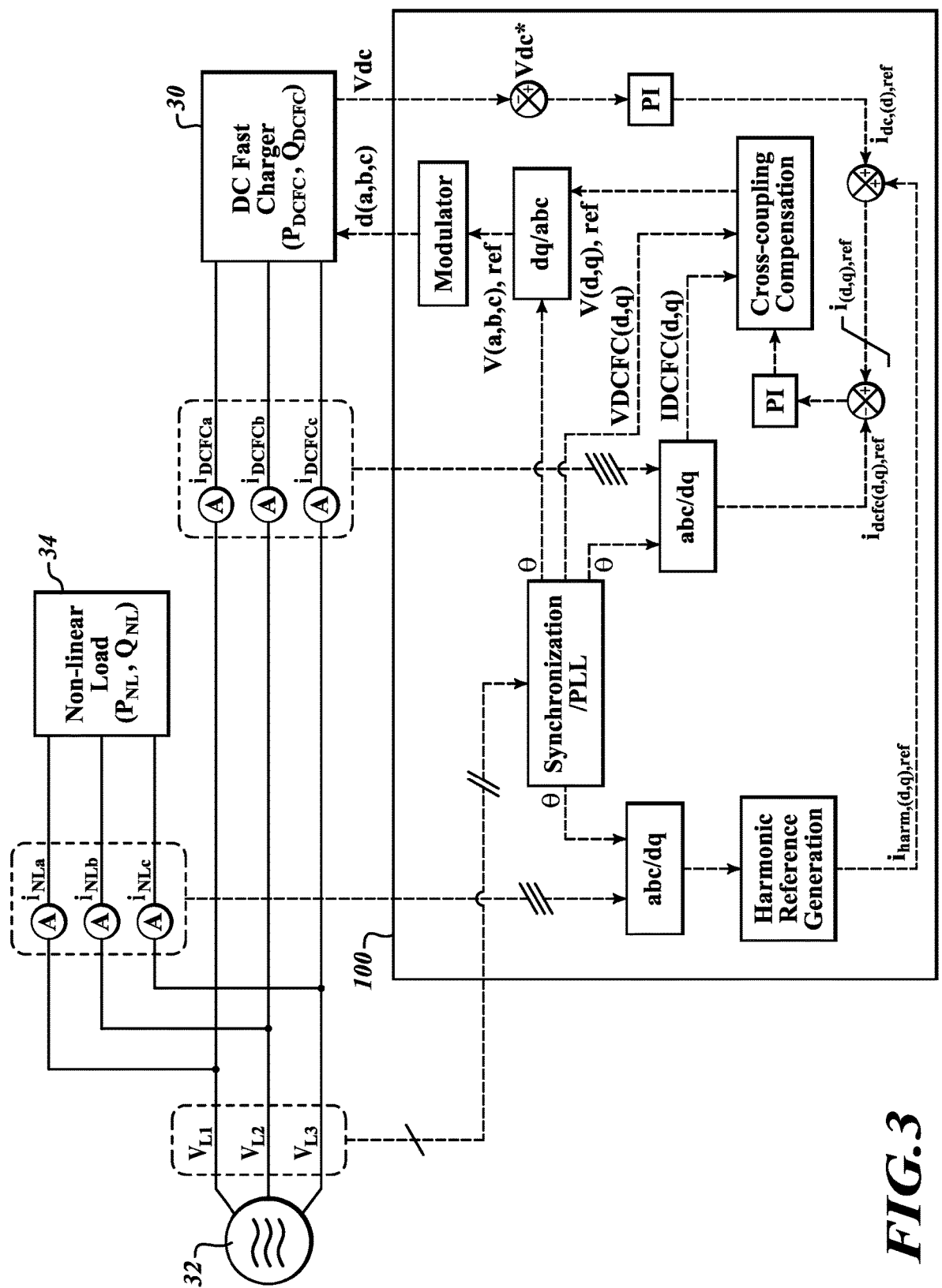
FIG. 3 is a controller diagram of an illustrative power quality control performed by a power electronics module.

Referring additionally to FIG. 3, in various embodiments an illustrative controller diagram 100 includes the operations performed by the PEM controller 82. The instructions within the PEM memory 84 are configured to cause the PEM controller 82 to calculate harmonic reference $i_{harm\,(a,b,c)}$ values of the received three-phase current values $i_{NL(a,b,c)}$ and generate rectifier three-phase voltage reference values $V_{(L1,L2,L3)}$ in response to the calculated harmonic reference values $i_{harm(a,b,c)}$ and the received three-phase grid current value $i_{NL(a,b,c)}$.

In various embodiments the three-phase grid voltage sensors 52 are configured to sense three-phase grid voltage values $V_{(L1,L2,L3)}$. The instructions in the PEM memory 84 are further configured to cause the PEM controller 82 to use the three-phase grid voltage values to convert the received three-phase current values from an abc reference frame to a dq reference frame, before calculating the harmonic reference values. The instructions within the PEM memory 84 are further configured to use the three-phase grid voltage values to convert the received three-phase grid current values from the abc reference frame to dq reference frame, before generating rectifier three-phase voltage reference values. The instructions within the PEM memory 84 are further configured use the three-phase grid voltage values to convert the generated rectifier three-phase voltage reference values from the dq reference frame back to the abc reference frame.

In various embodiments and given by way of example only and not of limitation, converting values between the dq reference frame to the abc reference frame may be performed by a transformation matrix, known as the Park's transformation matrix and the inverse Park's transformation matrix. The dq reference frame is used for more easily performing calculations on the signals and independent control the active (d-axis) and reactive (q-axis) components on current and voltage. Transformation operations are well known in the art and no further explanation is necessary for a person of skill in the art to understand disclosed subject matter.

The current control of DCFC PEM (or in this example specifically, the Vienna rectifier) is realized in dq reference frame. Synchronization (also known as phase lock loop) (PLL) will provide reference angle from the grid and thus get the parameters. The spacing vector voltage equation of rectifier can be expressed in terms of direct (d) and its quadrature (q) components, i.e.

$$v_d = L \cdot \frac{di_d}{dt} - L\omega i_q + V_{dc}/2 \cdot d'_d \quad (1)$$

$$v_q = L \cdot \frac{di_q}{dt} + L\omega i_d + V_{dc}/2 \cdot d'_q \quad (2)$$

Where $V_{dc}$ is the DC link voltage of DCFC and L is the inductance value within charger system.

The control system is derived based on above two equations. The total DC link voltage difference is brought to a PI controller which gives the rectifier d-component reference $i_{dc(d),ref}$. Furthermore, the balancing of the partial DC link voltages ($V_{PM}$ and $V_{MN}$) is carried out by feeding the partial DC link voltage error through a PI controller that approximates the value for the modulator that weights the duty cycles of the redundant vectors. $d_d'$ and $d_q'$ are the adjusted duty cycles with partial DC link voltage balancing.

The current of the nonlinear load $i_{NL(a,b,c)}$ are transformed into the dq reference frame and the harmonics are separated in the "harmonic separation" block. The details of separation is shown in more detail below.

In various embodiments and given by way of example only and not of limitation, the converted currents $i_{NL(d,q)}$ of the nonlinear load 34 are separated into harmonic components $i_{harm,(d,q),ref}$ using a harmonic separation algorithm.

The following equations illustrate a harmonic separation algorithm. The method is based on current prediction at stationary state as well as knowledge of system dynamics of the power converter. The general algorithm in discrete form is as follows:

$$i_{harm,dref}(k+1) = i_{NLd0}(k) - i_{NLd}(k-(m-2)) \quad (3)$$

$$i_{harm,qref}(k+1) = -i_{NLq}(k-(m-2)) \quad (4)$$

where k is a discrete time instant, m the number of samples in one period $T_u$ and $i_{Ld0}$ is the fundamental load current component in the dq reference frame. The reactive power of the load reference above is carried by the load current q component. Thus to compensate the fundamental reactive power, only the average of the load current d component needs further calculation. The floating average algorithm is well known and used here to get the $i_{NLd0}(k)$:

$$i_{NLd0}(k) = \frac{1}{m}\sum_{k-(m-1)}^{k} i_{ld}(k) = \frac{1}{m}[i_{NL,dsum}(k-1) - i_{NL,d}(k-m) + i_{NL,d}(k)] \quad (5)$$

During transient condiction, the compensation time $\tau_c$ is introduced to help with reference generation during step change condition. The algorithm in discrete form is as follows:

$$i_{harm(d,q),ref}(k+1) = -\frac{\tau_C}{T_s} * (i_{NL(d,q)}(k) - i_{NL(d,q)}(k-1)) - i_{NL(d,q)}(k), \quad (6)$$

where $\tau_c$ is the comensation time constant and $T_s$ is the sample time.

In various embodiments the harmonic components $i_{harm,(d,q),ref}$ are added to the rectifier current reference $i_{dc(d),ref}$ forming the rectifier current reference $i'_{(d,q),ref}$. The harmonic components $i_{harm,(d,q),ref}$ as stated above is to provide the harmonics reference the PEM 42 needs to compensate for power quality control. $i_{dc(d),ref}$ is used to maintain the total DC link voltage difference between $V_{dc}^*$ (which is pre-set by the controller 80) and measured DC link voltage $V_{dc}$. The difference is brought to a PI controller which gives the rectifier d-component reference $i_{dc(d),ref}$.

The converted three-phase grid current values is referred to as measured rectifier current $i_{DCFC(d,q)}$, which is subtracted from the rectifier current reference $i'_{(d,q),ref}$, thus producing current error values. A filter voltage reference $V_{(d,q),ref}$ is approximated from the current error values. Those skilled in the art will appreciate that various control loop algorithms may be used to approximate the filter voltage reference $V_{(d,q),ref}$, such as without limitation, a proportional-integral (PI) algorithm or comparable algorithms. A rectifier voltage reference $V_{(d,q),ref}$ as stated in equation (1) and (2) is calculated from the measured rectifier current $i_{DCFC(d,q)}$ and the three-phase grid voltage values converted into the abc reference frame using the transformation matrix. The rectifier voltage reference $V_{(d,q),ref}$ is converted back to the abc reference frame using the transformation matrix and the three-phase grid voltage values $v_{(a,b,c)}$ to produce rectifier voltage references $V_{(a,b,c),ref}$ in the abc reference frame. Control signals $CS_{1-6}$ are generated in response to the rectifier voltage references $V_{(a,b,c),ref}$. The modulation can be either space vectorpulse width modulation (SVPWM) or sinusoidal pulse width modulation (SPWM). Either modulation method is well known in the art and no further explanation is necessary for a person of skill in the art to understand disclosed subject matter. The control signals $CS_{1-6}$ are sent to the AC-DC converter 70 for controlling switches, such as without limitation field effect transistors, to provide power quality control.

Figure 4:
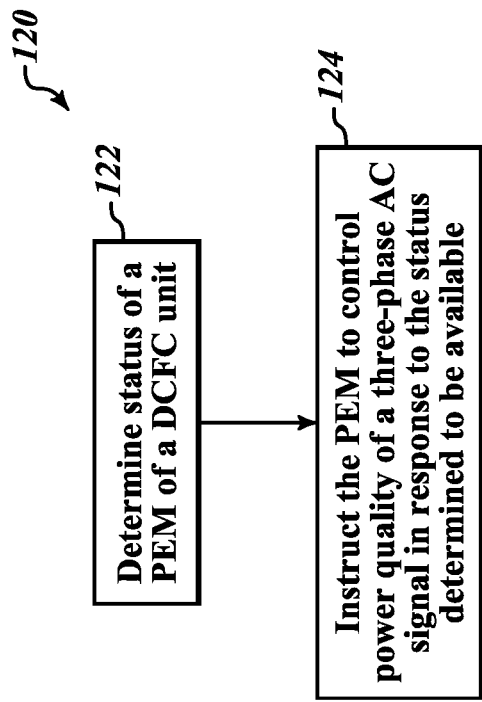
FIG. 4 is a flow chart of an illustrative method for operating a power electronics module.

Referring now to FIG. 4, in various embodiments an illustrative method 120 is provided for a controller of a DCFC unit. It will be appreciated that, in some embodiments, the method 120 may be suited for being performed by a controller module and/or a power converter controller executing instruction stored in a memory. At a block 122, the method 120 determines status of a PEM of a DCFC unit. At a block 124, the method 120 instructs the PEM to control power quality of a three-phase AC signal in response to the determined status being available.

In some embodiments, instructing the PEM to control power quality is terminated in response to the determined status being unavailable.

In some embodiments, a power quality control condition is determined to not exist. The PEM to control power quality is instructed to terminate in response to the determination that the power quality control condition does not exist.

Figure 5:
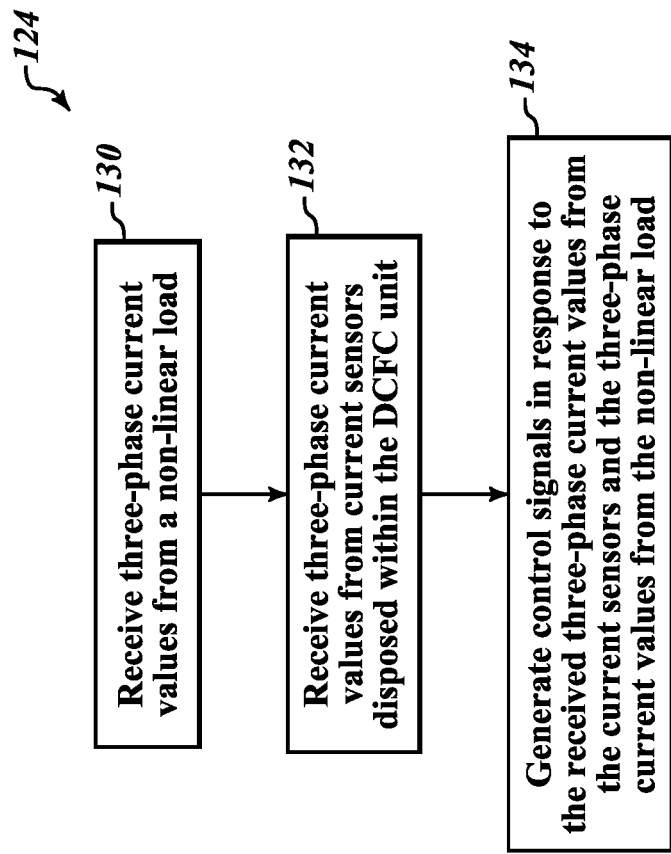
FIG. 5 is a flow chart of details of the method of FIG. 4.

Referring additionally to FIG. 5, in various embodiments an illustrative method expands on the process performed at the block 124 of FIG. 4. At a block 130, three-phase current values are received from a non-linear load that shares a three-phase grid power signal with the DCFC unit. At a block 132, three-phase current and voltage values are received from current and voltage sensors disposed within the DCFC unit. At a block 134, control signals are generated in response to the received three-phase non-linear current values and the received three-phase current and voltage values disposed within DCFC unit. After the block 134, the generated control signals are sent to an AC to DC converter within the DCFC unit.

Figure 6:
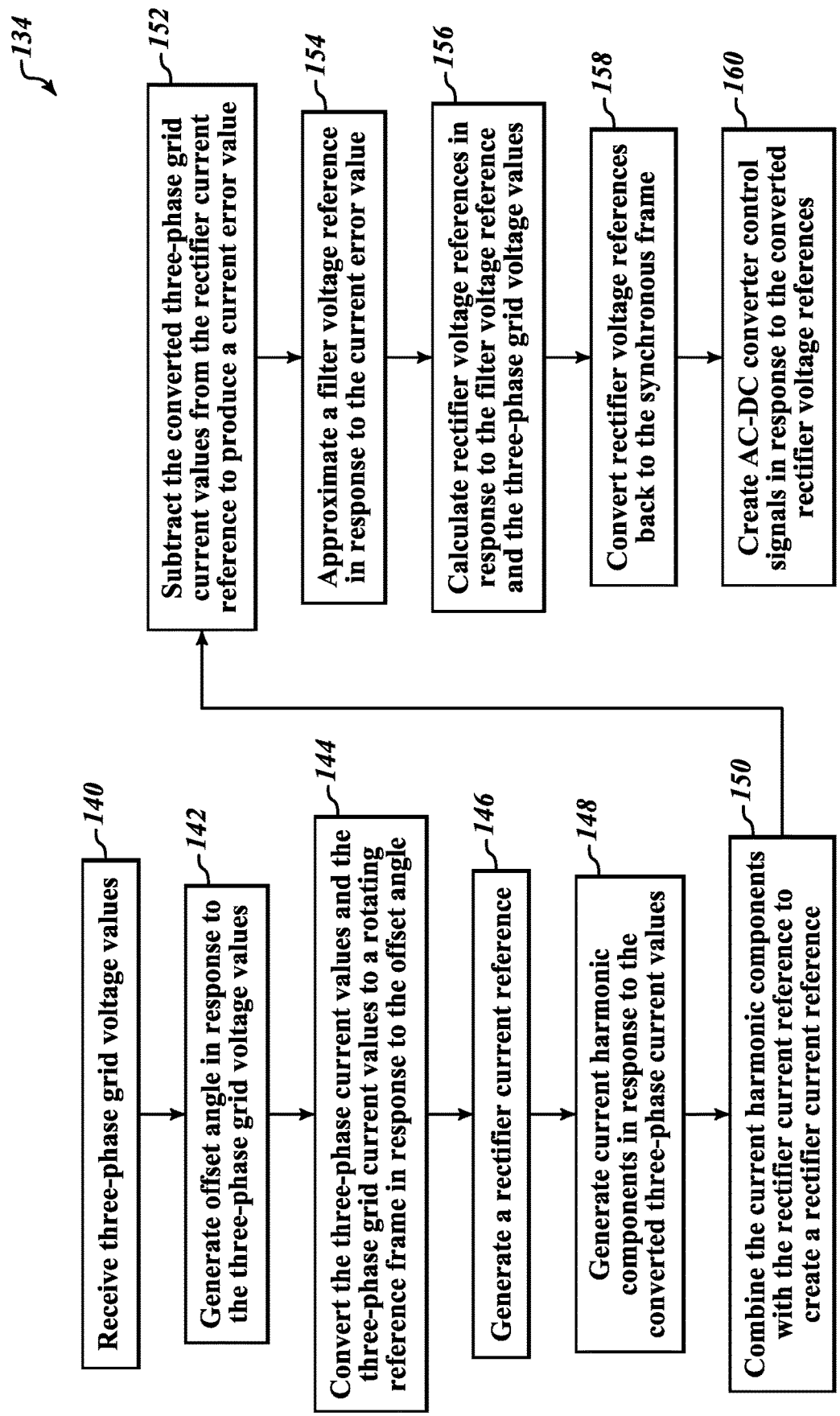
FIG. 6 is a flow chart of details of a portion of the method of FIG. 3.

Referring additionally to FIG. 6, in various embodiments an illustrative method expands on the process performed at the block 134 of FIG. 4. At a block 140, three-phase grid voltage values are received at the DCFC unit. At a block 142, a grid synchronization angle (θ) is determined in response to the received three-phase grid voltage values. At a block 144, the three-phase current values and the three-phase grid current values are converted to a dq reference frame in response to the synchronization angle (θ). At a block 146, a rectifier current reference is generated. This is done from abc reference frame to dq reference frame. At a block 148, current harmonic components are determined in response to the converted three-phase current values. At a block 150, a DC link sensing voltage is received. At a block 152, a DC voltage error value is generated in response to the DC link sensing voltage and a set point voltage. At a block 154, the current harmonic components, DC voltage error value after passing through a PI regulator, and the rectifier current reference from the block 146 are combined to create the final rectifier current reference, which provide functionality for DC link voltage regulation as well as non-linear load current harmonics compensation. At a block 156, the converted three-phase grid current values are subtracted from the rectifier current reference to produce a current error value. At a block 158, a filter voltage reference is approximated in response to the current error value using a PI algorithm or comparable algorithm. At a block 160, rectifier voltage references are calculated in response to the filtered voltage reference and the three-phase grid voltage values. At a block 162, the rectifier voltage references are converted back to the synchronous frame in response to the filter voltage reference and the three-phase grid voltage values. At a block 164, the DC link voltage is halved. At a block 166, the half DC link voltage error value is passed through a PI controller that approximates the value for variable that weights the modulator (DC link voltage adjustment factor). At a block 168, AC-DC converter control signals are created in response to combination of the half DC link voltage adjustment factor and the converted rectifier voltage references.

In some embodiments, generating control signals may include receiving three-phase grid voltage values from sensors disposed within the DCFC unit, converting the received three-phase current values and the received three-phase grid current values from a abc reference frame to a dq reference frame in response to the received three-phase grid voltage values, calculating harmonic reference values of the three-phase current values, generating rectifier three-phase voltage reference values in response to the calculated harmonic reference values and the received three-phase grid current values, receiving three-phase grid voltage values from sensors disposed within the DCFC unit, and converting the generated rectifier three-phase voltage reference values from the rotating reference frame to the synchronous reference frame.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A controller unit comprising:
   a controller; and
   a memory configured to store computer-executable instructions configured to cause the controller to:
      determine status of a power electronics module (PEM) of a direct current fast charging (DCFC) unit coupled to a power distribution system;
      instruct the PEM to control power quality of a three-phase alternating current (AC) grid power signal in response to the determined status being available; and
      receive three-phase current values from a non-linear load sharing a three-phase grid power signal with the DCFC unit and causing voltage and current distortions in the power distribution system and the DCFC unit in response to the instruction to control power quality.

2. The controller unit of claim 1, wherein the memory is further configured to store computer-executable instructions configured to cause the controller to:
   terminate instructing the PEM to control power quality in response to the determined status being unavailable.

3. The controller unit of claim 1, wherein the computer-executable instructions are further configured to cause the controller to:
   determine that a power quality control condition does not exist; and terminate instructing the PEM to control power quality in response to the determination that the power quality control condition does not exist.

4. The controller unit of claim 1, wherein the computer-executable instructions are further configured to cause the controller to:
receive three-phase grid current values and voltage values from current sensors and voltage sensors disposed within the DCFC unit in response to the instruction to control power quality.

5. The controller unit of claim 4, wherein the computer-executable instructions are further configured to cause the controller to:
generate control signals in response to the received three-phase grid current values, the received three-phase grid voltage values, and the received three-phase grid current values; and
send the generated control signals to an AC to DC converter.

6. The controller unit of claim 5, wherein the computer-executable instructions are further configured to cause the controller to:
calculate harmonic reference values of the received three-phase current values; and
generate rectifier three-phase voltage reference values in response to the calculated harmonic reference values and the received three-phase grid current values.

7. The controller unit of claim 4, wherein the computer-executable instructions are further configured to cause the controller to:
receive three-phase grid voltage values from sensors disposed within the DCFC unit;
convert the received three-phase current values and the received three-phase grid current values from a synchronous reference frame to a rotating reference frame in response to the received three-phase grid voltage values; and
convert the generated rectifier three-phase voltage reference values from the rotating reference frame to the synchronous reference frame.

8. A direct current fast charging (DCFC) unit comprising:
a power electronics module (PEM);
a first controller;
a memory configured to store computer-executable instructions configured to cause the first controller to:
determine status of the PEM; and
instruct the PEM to control power quality of a three-phase alternating current (AC) grid power signal in response to the determined status being available; and
a communication device configured to receive three-phase current values from a non-linear load sharing a three-phase grid power signal with the DCFC unit and causing voltage and current distortions in a power distribution system coupled to the DCFC unit and the DCFC unit.

9. The DCFC unit of claim 8, wherein the computer-executable instructions are further configured to cause the controller to:
terminate instructing the PEM to control power quality in response to the determined status being unavailable.

10. The DCFC unit of claim 8, wherein the computer-executable instructions are further configured to cause the first controller to:
determine that a power quality control condition does not exist; and
terminate instructing the PEM to control power quality in response to the determination that the power quality control condition does not exist.

11. The DCFC unit of claim 8, further comprising:
current sensors configured to receive three-phase grid current values; and
voltage sensors configured to receive three-phase grid voltage values.

12. The DCFC unit of claim 11, wherein the PEM further includes:
a second controller;
an AC-DC converter; and
a memory configured to store computer-executable instructions configured to cause the second controller to:
generate control signals in response to the received three-phase current values, the received three-phase grid voltage values, and the received three-phase grid current values; and
send the generated control signals to the AC to DC converter.

13. The DCFC unit of claim 12, wherein the computer-executable instructions stored in the memory of the PEM are further configured to cause the second controller to:
calculate harmonic reference values of the received three-phase current values; and
generate rectifier three-phase voltage reference values in response to the calculated harmonic reference values and the received three-phase grid current value.

14. The DCFC unit of claim 13, further comprising:
three-phase grid voltage sensors configured to sense three-phase grid voltage values; and wherein the computer-executable instructions stored in the memory of the PEM are further configured to cause the second controller to:
convert the received three-phase current values from a synchronous reference frame to a rotating reference frame, before calculating the harmonic reference values in response to the received three-phase grid voltage values;
convert the received three-phase grid current values from the rotating reference frame to the synchronous reference frame, before generating rectifier three-phase voltage reference values in response to the received three-phase grid voltage values; and
convert the generated rectifier three-phase voltage reference values from the rotating reference frame to the synchronous reference frame.

15. A method comprising:
determining status of a power electronics module (PEM) of a direct current fast charging (DCFC) unit coupled to a power distribution system;
instructing the PEM to control power quality of a three-phase alternating current (AC) signal in response to the determined status being available; and
receiving three-phase current values from a non-linear load sharing a three-phase grid power signal with the DCFC unit and causing voltage and current distortions in the power distribution system and the DCFC unit in response to the instruction to control power quality.

16. The method of claim 15, further comprising:
terminating instructing the PEM to control power quality in response to the determined status being unavailable.

17. The method of claim 15, further comprising:
determining that a power quality control condition does not exist; and
terminating instructing the PEM to control power quality in response to the determination that the power quality control condition does not exist.

18. The method of claim 15, further comprising:
receiving three-phase grid current values from current sensors disposed within the DCFC unit in response to the instruction to control power quality; and
receiving three-phase grid voltage values from voltage sensors disposed within the DCFC unit in response to the instruction to control power quality.

19. The method of claim 18, further comprising:
generating control signals in response to the received three-phase current values, three-phase grid voltage values, and the received three-phase grid current values; and
sending the generated control signals to an AC to DC converter.

20. The method of claim 19, wherein generating control signals includes:
receiving three-phase grid voltage values from sensors disposed within the DCFC unit;
converting the received three-phase current values and the received three-phase grid current values from a rotating reference frame to a synchronous reference frame in response to the received three-phase grid voltage values;
calculating harmonic reference values of the three-phase current values;
generating rectifier three-phase voltage reference values in response to the calculated harmonic reference values and the received three-phase grid current values;
receiving three-phase grid voltage values from sensors disposed within the DCFC unit; and
converting the generated rectifier three-phase voltage reference values from the rotating reference frame to the synchronous reference frame.

* * * * *